United States Patent [19]

Cichanowski et al.

[11] Patent Number: 4,618,911
[45] Date of Patent: Oct. 21, 1986

[54] END TERMINATION FOR CHIP CAPACITOR

[75] Inventors: Stanley W. Cichanowski, Bennington, Vt.; David G. Shaw, Glens Falls, N.Y.

[73] Assignee: SFE Technologies, San Fernando, Calif.

[21] Appl. No.: 672,528

[22] Filed: Nov. 19, 1984

[51] Int. Cl.[4] .......................... H01G 1/13; H01G 4/08
[52] U.S. Cl. ...................................... 361/308; 361/323
[58] Field of Search .............. 361/306, 308, 309, 310, 361/321 C, 328, 323, 433 C; 357/72

[56] References Cited

U.S. PATENT DOCUMENTS

| | | | |
|---|---|---|---|
| 2,820,934 | 1/1958 | Mullikin | 361/308 |
| 3,244,953 | 4/1966 | Walsh et al. | 361/323 |
| 3,496,435 | 2/1970 | Manley | 361/321 C |
| 3,665,267 | 5/1972 | Acello | 361/321 C |
| 3,855,505 | 12/1974 | Karlik et al. | 361/433 C |

FOREIGN PATENT DOCUMENTS 351809 8/1937 Italy .

Primary Examiner—Donald A. Griffin
Attorney, Agent, or Firm—Christie, Parker & Hale

[57] ABSTRACT

A monolithic chip capacitor in which the electrode layers are bonded together at an edge. The capacitor includes an electrically conductive substrate that is electrically connected to the bonded edges of the electrode layers. The capacitor body has end terminal surfaces defined by electrically conductive material across one end of the body that is in electrically conducting contact with the substrate. In one form, the termination material is a folded end of the substrate itself. In another form, an end cap which can be thicker than the substrate, is folded to define the termination surface and to provide another surface in good electrical contact with the substrate.

7 Claims, 3 Drawing Figures

U.S. Patent    Oct. 21, 1986    4,618,911
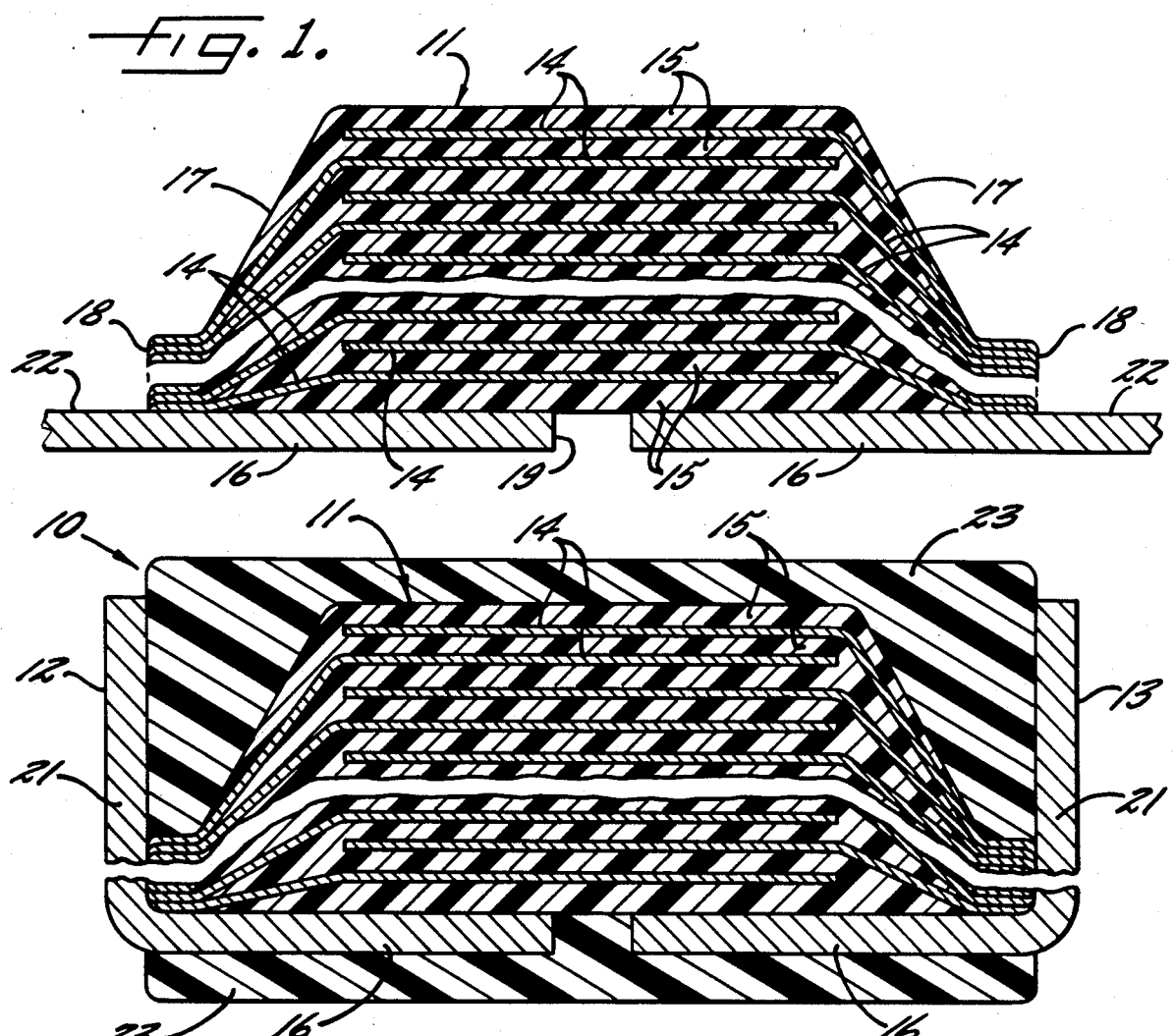
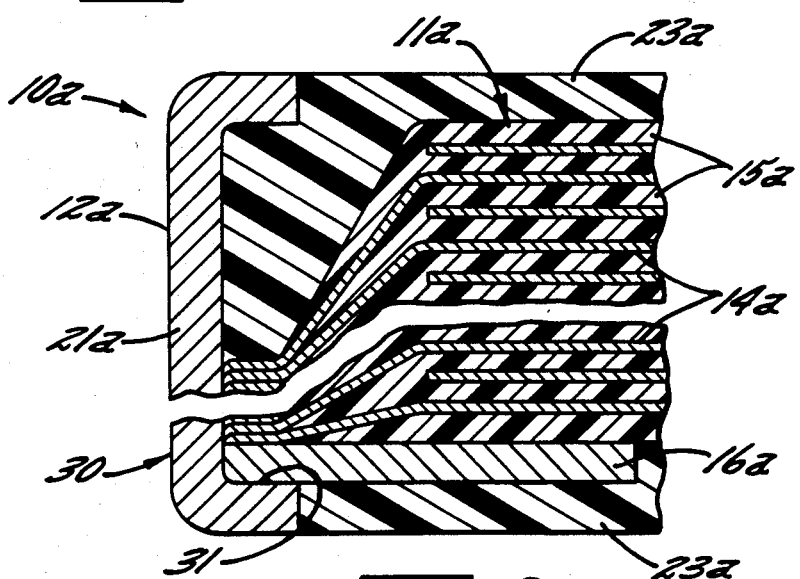

END TERMINATION FOR CHIP CAPACITOR

This invention relates generally to completing the construction of electrical capacitors and more particularly concerns making termination connections for the electrode layers of monolithic capacitors.

This invention is related to the following copending, commonly assigned, patent applications and patents: Ser. No. 620,647, filed June 14, 1984, now abandoned, and replaced by Continuation-in-part Application Ser. No. 620,647, filed June 14, 1984, entitled "Miniaturized Monolithic Multi-Layer Capacitor and Apparatus and Method for Making"; U.S. Pat. No. 4,499,520, issued Feb. 12, 1985, entitled "Capacitor With Dielectric Comprising PolyFunctional Acrylate Polymer and Method of Making"; U.S. Pat. No. 4,490,774, issued Dec. 25, 1984, entitled "Capacitors Containing Polyfunctional Acrylate Polymers as Dielectrics"; U.S. Pat. No. 4,533,710, issued Aug. 6, 1985, entitled "1; 2-Alkanediol Diacrylate Monomers and Polymers Thereof Useful as Capacitor Dielectrics"; U.S. Pat. No. 4,513,349 issued Apr. 23, 1985, entitled "Acrylate-Containing Mixed Ester Monomers and Polymers Thereof Useful as Capacitor Dielectrics"; and U.S. Pat. No. 4,515,931, issued May 7, 1985, entitled "Polyfunctional Acrylate Monomers for Polymers Thereof Useful as Capacitor Dielectrics"; all of which are hereby incorporated by reference.

It has become possible to make miniature monolithic capacitors having alternate layers of electrode material and dielectric material adding up to thousands of layers but with each layer being very thin. Application Ser. No. 620,647, now abandoned, referred to above, discloses capacitors in which the electrode layers defining the plates of the capacitor are 200–500 angstroms thick, and the electrode layers are separated by dielectric coatings from 0.1 to one micron thick. In the row or lane manufacturing configuration shown in said patent application, the electrode layers are electrically bonded together at the outer edges of sloping portions of the electrode layers and dielectric coatings. However, even a thousand electrode layers, each being 500 angstroms thick, stacked and bonded together represents metal only a fraction of a millimeter thick, which does not provide much surface or strength to create an electrical termination point for the finished capacitor.

A chip capacitor is one in which the capacitor body has a pair of electrically conductive surfaces that constitute the opposite electrical terminals of the capacitor. There are no wire leads. Chip capacitors are typically electrically secured in a circuit by wave soldering techniques which subject the termination surfaces to temperatures of about 280° C. for 10 to 30 seconds. The capacitor termination surfaces should have suitable strength and integrity.

It is therefore an object of the invention to provide an improved end termination for a chip capacitor that has sufficient strength and area to permit reliable electrical installation.

Another object is to provide a termination as characterized above that economically utilizes the characteristics of a miniature monolithic capacitor formed by depositing alternate layers of electrode material and coatings of dielectric.

Other objects and advantages of the invention will become apparent upon reading the following detailed description and upon reference to the drawings, in which:

FIG. 1 is a fragmentary section that has been formed but not completed into the final package;

FIG. 2 is a fragmentary section of a completed capacitor utilizing the structure of FIG. 1; and FIG. 3 is a fragmentary section of an alternate form of capacitor embodying the invention.

While the invention will be described in connection with preferred embodiments, it will be understood that we do not intend to limit the invention to those embodiments. On the contrary, we intend to cover all alternatives, modifications and equivalents as may be included within the spirit and scope of the invention as defined by the appended claims.

Turning now to the drawings, there is shown a capacitor 10 having a capacitor body 11 and opposite termination surfaces 12 and 13, defining a chip capacitor configuration. The capacitor body 11 includes interleaved electrode layers 14 of conductive material such as aluminum spaced and held by coatings 15 of dielectric material such as a resin to form a multi-layer capacitor body. Preferably, the capacitor 10 is formed in accordance with the methods and apparatus of said application Ser. No. 620,647 so that, as shown in FIG. 1, successive coatings 15 of dielectric material and layers 14 of electrode material are deposited on an electrically conductive substrate 16 so as to form both the capacitor body 11 and also tapered shoulder portions 17 in which the dielectric coatings 15 are tapered to zero thickness and the edges of the alternate electrode layers 14 are bonded to the substrate 16 at terminal portions 18. Since the cross section configuration in FIG. 1 can be produced in long strips, side by side, this is called a row manufacturing configuration.

Although only a few electrode pairs are shown here, it will be understood that a capacitor having many hundred electrode layers 14 is only about 200–500 angstroms thick, the intervening dielectric coatings are from 0.1 to 1 micron thick, and the substrate 16 is a copper sheet about 1.5 to 2 mils thick. To electrically separate the terminal portions 18, the substrate 16 is notched through at 19.

In accordance with the invention, the opposite terminal surfaces 12, 13 are approximately equal in area to the ends of the capacitor body 11 and are defined by electrically conductive material 21 in intimate electrically conducting contact with the substrate 16. In the embodiment of FIGS. 1 and 2, the material 21 constitutes extending portions 22 of the substrate 16 itself bent at right angles. In this case, the extending substrate portions 22 are bent across the ends of the body 11, and the body is surrounded, and the portions 22 are backed up and supported, by plastic encapsulating material 23. The resulting capacitor 10 is thus a substantially rectangular encapsulated body with opposite metal termination material 21 defining the surfaces 12, 13.

An alternate design would result from bending the extending substrate portions 22 in the opposite direction, down in FIG. 1, which after encapsulation would produce a capacitor having an encapsulated body with two substantially sized termination tabs, being the portions 22, extending from opposite ends.

Another alternative is shown in FIG. 3 in which parts previously described have been given the same reference numerals with the distinguishing suffix a added. Here, the capacitor 10a has electrically conductive material 21a constituting a metal end cap 30 that defines the termination surface 12a. The cap 30 is bent so as to have a surface 31 in electrically conducting contact with the substrate 16a. In the embodiment illustrated, the cap 30 has each edge bent and the midportion of the capacitor 10a, and including the capacitor body 11a, is surrounded by encapsulating material 23a. This form of capacitor permits the termination surface 12a to be defined by material of greater thickness, and hence strength, than that afforded by the substrate 16a itself.

It can now be seen that there has been provided a monolithic chip type capacitor with end termination portions having both strength and sufficient surface area to permit reliable electrical installation despite the small overall size of the device. Those skilled in the art will also appreciate that the end termination technique discussed economically utilizes the advantages of the miniature monolithic capacitor design disclosed in the previously referenced application Ser. No. 620,647.

It will be understood that the foregoing description is only of certain preferred embodiments, and the invention is to be determined by giving the following claims their proper scope and interpretation.

We claim as our invention:

1. In a monolithic capacitor having electrode layers with the edge of adjacent electrode layers at each end of the capacitor bonded to each other and at least one of said edges bonded to an electrically conductive substrate and center portions spaced and held by dielectric material in an interleaved, multi-layer capacitor body, the improvement comprising, electrically conductive material defining a termination surface approximately equal in area to one end of said capacitor body, and said material being in intimate, electrically conducting contact with said substrate.

2. The improvement of claim 1 in which said conductive material is an extending portion of said substrate bent to define said termination surface.

3. The improvement of claim 2 in which said extending portion is bent across the end of the capacitor body, and including encapsulating material enclosing the capacitor body and supporting the extending portion.

4. The improvement of claim 1 in which said conductive material is an electrically conductive end cap bent to have one surface in electrically conducting contact with the substrate and another surface defining the termination surface.

5. In a monolithic capacitor having electrode layers with their edges bonded to an electrically conductive substrate and center portions spaced and held by dielectric material in an interleaved, multi-layer capacitor body, the improvement comprising, electrically conductive material defining a termination surface approximately equal in area to end of said capacitor body, said material being an extending portion of said substrate so as to be in intimate, electrically conducting contact with the rest of the substrate, said extending portion being bent across the end of the capacitor body, and encapsulating material enclosing the capacitor body and supporting the extending portion.

6. A monolithic capacitor comprising a plurality of electrode layers with the edges of adjacent electrode layers at each end bonded to each other and to an electrically conductive substrate, center portions spaced and held by dielectric material in an interleaved, multi-layer capacitor body, and electrically conductive material defining a termination surface approximately equal in area to each end of said capacitor body, and said material being an extending portion of said substrate bent to define said termination surface and in intimate, electrically conducting contact with said substrate.

7. A monolithic capacitor comprising a plurality of electrode layers with the edges of adjacent electrode layers at each end of the capacitor bonded to each other and at least one of said edges bonded to electrically conductive substrate center portions spaced and held by dielectric material in an interleaved, multi-layer capacitor body, and electrically conductive material defining a termination surface, said material being in intimate, electrically conducting contact with said substrate and the edges of the electrode layer.

* * * * *